(12) United States Patent
Sridhar et al.

(10) Patent No.: US 7,484,010 B2
(45) Date of Patent: Jan. 27, 2009

(54) METHOD FOR TRAFFIC ENGINEERING IN A MULTI-HOMED VIRTUAL PRIVATE LOCAL AREA NETWORK SERVICE

(75) Inventors: Kamakshi Sridhar, Plano, TX (US); Maher Ali, Richardson, TX (US)

(73) Assignee: Alcatel Lucent, Paris (FR)

( * ) Notice: Subject to any disclaimer, the term of this patent is extended or adjusted under 35 U.S.C. 154(b) by 914 days.

(21) Appl. No.: 10/729,124

(22) Filed: Dec. 5, 2003

(65) Prior Publication Data
US 2005/0132088 A1 Jun. 16, 2005

(51) Int. Cl.
G06F 15/16 (2006.01)
(52) U.S. Cl. .................. 709/249; 709/220; 370/238; 370/397
(58) Field of Classification Search .................. 709/220
See application file for complete search history.

(56) References Cited

U.S. PATENT DOCUMENTS 6,584,071 B1* 6/2003 Kodialam et al. ........... 370/238
2005/0138008 A1* 6/2005 Tsillas .......................... 707/3

FOREIGN PATENT DOCUMENTS

WO WO 03/079614 A1 9/2003

OTHER PUBLICATIONS

PPVN WG IETF Draft "GVPLS/LPE—Generic VPLS Solution based on LPE Framework", Radoaca et al, Oct. 2002.*
Internet Draft IETF"L2VPN Requirements", Augustyn et al, May 2003.*
Lasserre, Kompella et al., Virtual Private LAN Service over MPLS draft-lasserre-vkompella-ppvpn-vpls-or.txt; Mar. 2003; pp. 1-26; Internet Draft Document.
K. Kompella et al., Decoupled Virtual Private LAN Services; draft-kompella-ppvpn-dtls-02.txt; May 2003; pp. 1-16; Internet Draft.
Augustyn, et al.; Requirements for Virtual Private LAN Services (VPLS); IETF PPVPN Working Group; Internet Draft; Oct. 2002; pp. 1-17.

* cited by examiner

*Primary Examiner*—John Follansbee
*Assistant Examiner*—Glenford Madamba

(57) ABSTRACT

A processing device (CM) programmed to determine homing paths for a plurality of virtual private local area network services in an Ethernet network comprising a plurality of PE nodes. The processing device is programmed to perform the steps of computing (32-48) a plurality of sets of different homing configurations, computing (52) a cost function for each set of different homing configurations in the plurality of sets of different homing configurations, and selecting (58) a set of homing configurations from the plurality of sets of different homing configurations in response to a respective computed cost function.

21 Claims, 2 Drawing Sheets

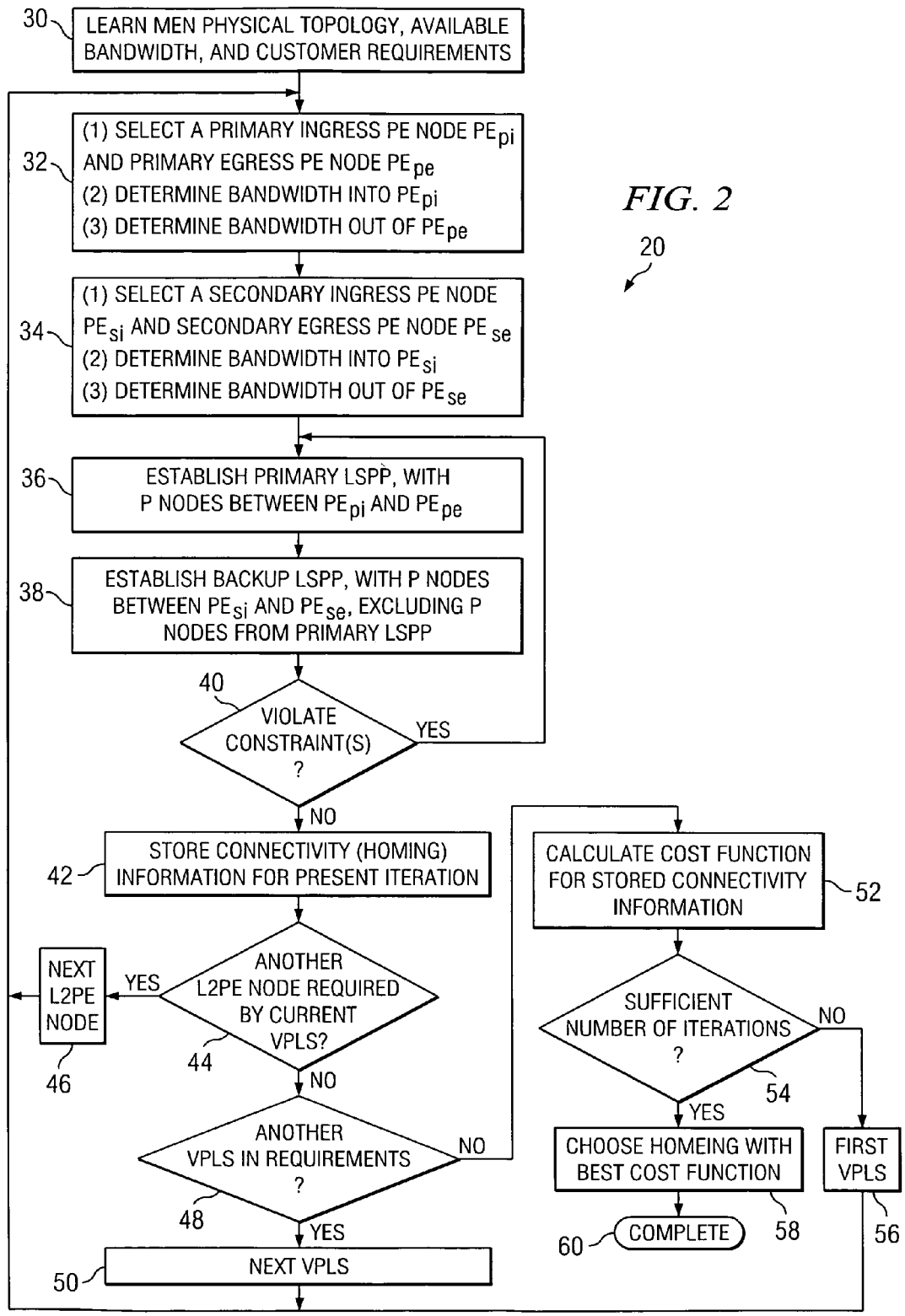

US 7,484,010 B2

METHOD FOR TRAFFIC ENGINEERING IN A MULTI-HOMED VIRTUAL PRIVATE LOCAL AREA NETWORK SERVICE

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to a method for traffic engineering in a multi-homed Virtual Private Local Area Network Service of a Metro Ethernet Network.

Ethernet networks have found favor in many applications in the networking industry for various reasons. For example, Ethernet is a widely used and cost effective medium, with numerous interfaces and capable of communications and various speeds up to the Gbps range. Ethernet networks may be used to form a Metro Ethernet Network ("MEN"), which is generally a publicly accessible network that provides a Metro domain, typically under the control of a single administrator, such as an Internet Service Provider ("ISP"). A MEN is typically used to connect between an access network and a core network. The access network typically includes private or end users making connectivity to the network. The core network is used to connect to other Metro Ethernet Networks, and the core network provides primarily a packet switching function.

A MEN typically consists of a number of Provider Edge ("PE") nodes that are identified and configured for communicating with one another prior to the communication of packet traffic. The PE nodes are connected in a point-to-point manner, that is, each PE node is connected to another PE node in an emulated and bi-directional virtual circuit manner, where each such connection is achieved by a Label Switched Path ("LSP"). An LSP is sometimes informally referred to as a link. Thus, each PE node may communicate to, and receive packets from, an adjacent PE node. Further, along each LSP, between adjacent PE nodes, are often a number of Provider ("P") nodes. The P nodes maintain no state information and serve primarily a routing function and, thus, are understood not to disturb the point-to-point connection between the PE nodes of the MEN, which are more intelligent devices. A different number of P nodes may be connected in one communication direction between two adjacent PE nodes as compared to the reverse communication direction between those same two adjacent PE nodes.

PE nodes in the MEN are also coupled to one or more Customer Edge ("CE") nodes, where those CE nodes thereby represent the interface between the MEN and an adjacent access network. Often in the art, the coupling of a PE node to a CE node is through an intermediate node between the PE node and the CE node, where such an intermediate node is referred to as a layer 2 Provider Edge ("L2PE") node. The connectivity between an L2PE node and additional PE nodes in the MEN is typically referred to as homing. More particularly, if the L2PE node is connected to a single PE node, then the connection is referred to as a single home; in contrast, if the L2PE node is connected to more than one PE node, then the connection is referred to as multi-homed. Further, while L2PE nodes may be multi-homed (i.e., connected to more than one other PE node), the CE nodes of any adjacent access network may not, that is, each CE node may connect to only a single L2PE node.

With the development of the MEN architecture, there have further evolved additional topologies associated with such a network. One example, that pertains to the preferred embodiments that are described later, is the virtual private local area network service ("VPLS"). A VPLS creates an emulated local area network ("LAN") segment for a given set of nodes in a MEN. The VPLS delivers an ISO layer 2 broadcast domain that is fully capable of learning and forwarding on Ethernet MAC addresses that is closed to a given set of nodes. Thus, within the VPLS, packets may be broadcast to all nodes on the VPLS. VPLS also may be included within the above-described framework that includes PE and L2PE nodes, subject to various constraints. First, more than one VPLS may be included in a single MEN and, thus, certain PE nodes of that MEN may be a part of more than one VPLS. Second, with a multiple VPLS MEN, an L2PE node may support more than one VPLS, where each such VPLS has its own respective homing, that is, for each VPLS, that L2PE has a connection to one (and only one) PE node in the MEN.

Given the various nodes, attributes, and connectivity described above and known in the art, complexities arise in traffic engineering with such parameters, that is, in establishing network communications, appropriate numbers of VPLSs, connectivity, and efficient use of bandwidth. These complexities arise both in establishing these parameters in a new network for the first time as well as modifying that network if one or more factors change over time, such as when a new VPLS is added. These complexities are further complicated by the desire to include 1+1 protection in a network, whereby a first set of parameters are provided, sometimes referred to as a primary network, but are supplemented by a second set of parameters, sometimes referred to as a secondary or backup network, to operate should the first network become inoperable.

In view of the above, the preferred embodiments provide a device (e.g., network node) with sufficient processing functionality and programmed to provide traffic engineering of a VPLS network with multi-homing, with unicast and multicast traffic, and with 1+1 protection, as further detailed below.

BRIEF SUMMARY OF THE INVENTION

In the preferred embodiment, there is a processing device programmed to determine homing paths for a plurality of virtual private local area network services in an Ethernet network comprising a plurality of PE nodes. The processing device is programmed to perform the steps of computing a plurality of sets of different homing configurations, computing a cost function for each set of different homing configurations in the plurality of sets of different homing configurations, and selecting a set of homing configurations from the plurality of sets of different homing configurations in response to a respective computed cost function. Each homing configuration in each set of different homing configurations is computed by a respective iteration of steps, where each iteration corresponds to a respective virtual private local area network service in the plurality of virtual private local area network services and for a respective selected layer two provider edge node in the Ethernet network. Each iteration comprises the steps of selecting an ingress PE node and an egress PE node, determining bandwidth into the ingress PE node, determining bandwidth out of the egress PE node, and specifying a first path for communication from the ingress PE node to the egress PE node and a second path for communication from the egress PE node to the ingress PE node, wherein each path of the first and second paths comprises at least one P node.

Other aspects are also described and claimed.

BRIEF DESCRIPTION OF THE SEVERAL VIEWS OF THE DRAWING

FIG. 2 illustrates a flow chart of the preferred embodiment methodology of the central manager to determine the VPLS connectivity of the network.

DETAILED DESCRIPTION OF THE INVENTION

Figure 1:
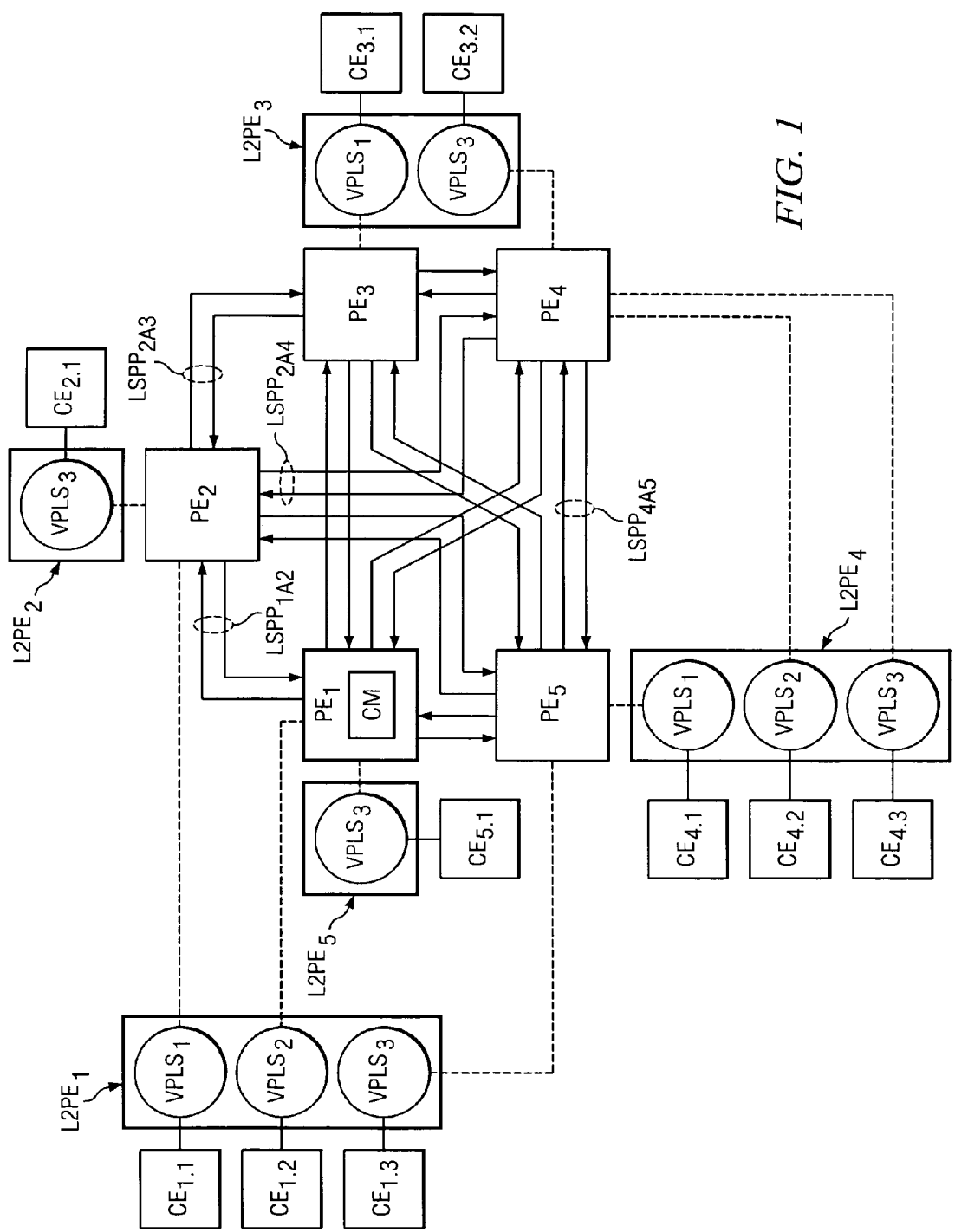
FIG. 1 illustrates a network system according to the preferred embodiment and having connectivity which may be configured by a central manager in the network system also according to the preferred embodiment.

By way of illustration of one preferred inventive implementation, FIG. 1 depicts a network system designated generally at 10. Network system 10, in the preferred embodiments, includes a Metro Ethernet Network ("MEN") that includes a virtual private local area network service ("VPLS"). System 10 as shown in FIG. 1 illustrates such a network with various aspects that are generally known in the art, where the illustration is included to introduce various concepts and conventions and also because it is established and modified according to the preferred embodiments as detailed later.

By way of example, the MEN of system 10 includes five Provider Edge ("PE") nodes $PE_1$, $PE_2$, $PE_3$, $PE_4$, and $PE_5$, where the choice of five is only as an illustration and one skilled in the art should appreciate that any number of such nodes may be included. Indeed, note that often a MEN will include considerably more than five PE nodes. Each PE node may be constructed as a processing device by one skilled in the art using various hardware, software, and programming so as to perform the functionality described in this document as well as that known in the art. Further, as a MEN system, while not shown but as also mentioned earlier in the Background Of The Invention section of this document, it should be understood that between adjacent PE nodes there may be located a number of Provider ("P") nodes. In the MEN of system 10, preferably the network is fully meshed, that is, each PE node $PE_x$ is connected to every other PE node in the system, where each connection is by way of a respective Label Switched Path ("LSP") and is illustrated in FIG. 1 with an arrow. Further, for sake of reference in this document, the bidirectional connection between two nodes is by way of two opposite direction LSPs, that is, by an LSP pair ("LSPP") that includes one LSP for communications in one direction from a first PE node to a second node and another LSP for communications in the opposite direction, that is, from the second PE node to the first PE node. As an example, PE node $PE_1$ is connected, via four respective LSPPs, to each of PE nodes $PE_2$, $PE_3$, $PE_4$, and $PE_5$. Also, for sake of convention, the label used for each LSPP in FIG. 1 identifies the two PE nodes between which the LSPP is connected. For example, between PE nodes $PE_1$ and $PE_2$ is an $LSPP_{1,2}$; as another example, between PE nodes $PE_3$ and $PE_4$ is an $LSPP_{3,4}$. To simplify FIG. 1, only a few of these LSPPs are so labeled. Given the connectivity of system 10, any PE node may communicate as a source directly along an ISP to any other PE node as a destination, where that destination PE node may respond along another LSP (albeit through a different set of P nodes) in the reverse direction back to the source PE node. A single communication between two PE nodes in one direction and in this manner is referred to in the art as a unicast communication and, thus, the various LSPPs of system 10 in FIG. 1 define the point-to-point interfaces along which unicast traffic is allowed to pass. When a single PE node endeavors to communicate a packet to more than one destination PE node, then such a communication by way of contrast is referred to in the art as a multicast communication.

Continuing with the MEN of system 10 in FIG. 1, it also includes a number of layer 2 PE nodes ("L2PE nodes") $L2PE_1$, $L2PE_2$, $L2PE_3$, $L2PE_4$, and $L2PE_5$, where the choice of five is only as an illustration and one skilled in the art should appreciate that any number of such nodes may be included. Each L2PE is also connected to at least one PE node in the MEN. More specifically, each L2PE supports one or more logical entities corresponding to one or more VPLSs, and each such VPLS logical entity has a single LSPP connection to only one PE node in the MEN; to simplify the illustration, each such single LSPP connection is shown with only a single dashed line, although it should be understood to include two LSPs in the same manner as the other PE node-to-PE node connections in FIG. 1. By way of example and looking to L2PE node $L2PE_1$, it has a VPLS logical entity $VPLS_1$ connected to PE node $PE_2$, a VPLS logical entity $VPLS_2$ connected to PE node $PE_1$, and a VPLS logical entity $VPLS_3$ connected to a PE node $PE_5$. Each VPLS logical entity is part of an overall VPLS; for example, VPLS logical entity $VPLS_1$ in $L2PE_1$ is part of $VPLS_1$, which is also supported in $L2PE_3$ and $L2PE_4$. Note also that L2PE node $L2PE_1$ is multi-homed, that is, it is connected to more than one PE node; in contrast, L2PE node $L2PE_5$ is single homed in that it supports only a single VPLS logical entity (i.e., $VPLS_3$), and it is connected to a single PE node $PE_1$. Notwithstanding the single homing of L2PE node $L2PE_5$, network system 10 is considered multi-homed because it includes one or more other multi-homed L2PE nodes. Additionally, by definition, an L2PE node provides an interface between the MEN and an access network that includes customer nodes, where at this interface each L2PE node is connected to one or more customer edge ("CE") nodes; indeed, typically a single L2PE node is connected to one CE node for each logical VPLS entity in that L2PE node, that is, each CE node is associated with a respective logical VPLS entity in the L2PE node. To illustrate these aspects, and by way of example with respect to L2PE node $L2PE_1$, it is connected to three CE nodes $CE_{1.1}$, $CE_{1.2}$, and $CE_{1.3}$, corresponding to its three logical VPLS entities $VPLS_1$ $VPLS_2$, and $VPLS_3$. Similar connectivity is shown for all other L2PE nodes $L2PE_x$ in system 10 being connected to multiple respective CE nodes, where by way of example for each such L2PE nodes having V logical VPLS entities, then the L2PE node is connected to V CE nodes.

Given the connectivity in FIG. 1, one skilled in the art should appreciate that the example depicts three different VPLSs, where the homing between each L2PE and its associated PE nodes are summarized in the following Table 1:

TABLE 1

| L2PE | Homed PE node(s) |
|---|---|
| $L2PE_1$ | $PE_1$, $PE_2$, $PE_5$ |
| $L2PE_2$ | $PE_2$ |
| $L2PE_3$ | $PE_3$, $PE_4$ |
| $L2PE_4$ | $PE_4$, $PE_5$ |
| $L2PE_5$ | $PE_1$ |

From Table 1 and FIG. 1, note also that different logical VPLS entities in a same L2PE node may connect to a same PE node, as is shown by way of example with respect to L2PE node L2PE$_4$, which supports both a logical VPLS entity VPLS$_2$ and a logical VPLS entity VPLS$_3$, both of which area connected to a same PE node PE$_4$. Moreover, the collection of PE nodes connected to each VPLS may be summarized, as shown in the following Table 2:

TABLE 2

| VPLS | Homed PE node(s) |
|---|---|
| VPLS$_1$ | PE$_2$, PE$_3$, PE$_5$ |
| VPLS$_2$ | PE$_1$, PE$_4$ |
| VPLS$_3$ | PE$_5$, PE$_2$, PE$_4$, PE$_1$ |

Thus, Table 2 identifies the PE nodes that belong to each VPLS; for example, only PE nodes PE$_2$, PE$_3$, and PE$_5$ belong to VPLS$_1$, and so forth for the other two VPLSs with their respective PE nodes. Thus, given the illustration of FIG. 1 and Tables 1 and 2, one skilled in the art should appreciate the three different VPLSs and the PE nodes connected among each such VPLS.

Concluding the description of FIG. 1, note also that it illustrates only a first set of connections for a first, or primary, network. In other words, for each logical VPLS entity supported by a respective L2PE node, that logical VPLS entity is shown as 10 connected to only a single PE node; however, it should be understood that FIG. 1 may be-redrawn with different connectivity to illustrate a second, or backup, network whereby each logical VPLS entity, supported by a respective L2PE, is connected to a different single PE node as compared to that shown in FIG. 1. The combination of the primary and backup networks will be understood by one skilled in the art to thereby provide so-called 1+1 protection so that if a connection failure occurs on one network (e.g., the first or "primary" network), then traffic may be established as an alternative along the second, or backup, network. Lastly, note that PE node PE$_1$ is shown in FIG. 1 to include a block depicting a central manager CM. In the preferred embodiment, central manager CM is intended to represent an overall processing function that develops the traffic engineering in the multi-homed network system 10. This function may be included in one of the PE nodes such as illustrated in FIG. 1, or alternatively a central manager CM may be a separate node or computing device that is not one of the PE nodes in the network. In either case, central manager CM represents a processing device with sufficient knowledge of the state of the network to which it is coupled so as to provide the remaining functionality described herein. The actual hardware, software, and programming to achieve such a device are readily ascertainable by one skilled in the art given the functional description in this document.

FIG. 2 illustrates a flowchart of a method 20 of steps performed by central manager CM of FIG. 1 in its effort to conduct traffic engineering as introduced above, that is, central manager CM is programmed to perform these steps with the results described later. By way of additional background to method 20, note generally that method 20 operates in an iterative fashion to optimize a cost function that, when optimized, provides primary and backup homes in network system 10, in addition to the LSPs. In general, the preferred embodiment choice of homes for the various VPLSs, and the design of the primary and backup paths, is such that traffic is optimized across the various PE and P nodes and links in the network, and 1+1 protection is provided in the event of node or link failure. In addition, unicast traffic and multicast traffic preferably is considered. Also, the preferred embodiment may operate with respect to either a decoupled VPLS or a hierarchical VPLS. In a decoupled VPLS, multi-homing is supported, with one home for each VPLS within an L2PE node L2PE$_x$, as shown in FIG. 1. In a hierarchical VPLS, only dual homing is supported, with one home being the primary home, and the other home being the backup home. In any event, for sake of simplification, the following discussion assumes a decoupled VPLS such as shown in FIG. 1, where one skilled in the art will appreciate the comparable aspects as applying to hierarchical VPLS. Additionally, for more details with respect to decoupled VPLS, the reader is referred to K. Kompella et. al, *Decoupled Virtual Private LAN Services*, IETF draft, "draftkompella-ppvpn-dtls-02.txt", which is hereby incorporated by reference. Similarly, for more details with respect to hierarchical VPLS, the reader is referred to M. Lasserre, V. Kompella et. al, *Virtual Private LAN Services over MPLS*, IETF draft, "draft-lasserre-vkompella-ppvpn-vpls-03.txt", which is hereby incorporated by reference.

Turning now to method 20 in more detail, it commences with a step 30. In step 30, central manager CM learns the MEN physical topology of network system 10 as well as the available bandwidth of system 10. This step 30, therefore, is intended to represent that various topology and bandwidth information is made available to central manager CM. The manner of making such information known to central manager CM may be automated in certain respects, such as by having the various nodes within system 10 provide signaling to central manager CM to provide the topology information. Alternatively, some or all of this information may be manually provided to central manager CM. Further, where method 20 is performed to update the traffic engineering on a previously-configured network, then some of the topology information may be communicated electronically from one or more nodes in network system 10. In any event, in the preferred embodiment, the topology information includes the set of all P nodes, all PE nodes, and all L2PE nodes in the MEN; thus, in the example of FIG. 1, the topology information includes PE nodes PE$_1$ through PE$_5$, the P nodes (not shown but described earlier), and the L2PE nodes L2PE$_1$ through L2PE$_5$. In addition, the topology information preferably includes all physical links, where a link, also referred to as an edge, is edge e=(a,b), with a or b belonging to all nodes and thus each edge being a connection between two such nodes. In addition, central manager CM is informed of the network bandwidth given the physical topology. More particularly, the bandwidth includes the bandwidth capability between each adjacent P node P$_i$ and P$_j$ inside the MEN. In addition, the bandwidth includes the bandwidth capability between each L2PE node L2PE$_i$ node and each PE node PE$_j$. Lastly, the bandwidth includes the expected traffic between various CEs for various VPLSs, that is, for all CEs belonging to a VPLS, the traffic going from CE node CE$_i$ to CE$_j$ is given. Note that in the preferred embodiment this expected traffic may be assembled in the form of a two-dimensional matrix that includes unicast and multicast traffic bandwidth expectations; for example, such a matrix for unicast and multicast traffic may have the information as shown in the following Table 3.

TABLE 3

| | egress CE$_1$ | egress CE$_2$ | ... | egress CE$_n$ |
|---|---|---|---|---|
| ingress CE$_1$ | 0 | 1.4 Gb | 2 Gb | 1.7 Gb |
| ingress CE$_2$ | 3.1 Gb | 0 | 2.3 Gb | 2.5 Gb |
| . | 2.9 Gb | 1.7 Gb | 0 | 2.4 Gb |
| . | | | | |
| . | | | | |
| ingress CE$_n$ | 3 Gb | 2.3 Gb | 2.8 Gb | 0 |

In Table 3, the terms ingress and egress are intended to identify the direction of traffic for a given CE node as it communicates traffic with respect to the MEN. Thus, an ingress CE node $CE_n$ is one that is receiving traffic which will then enter into the MEN, and an egress CE node $CE_n$ is one that is receiving traffic that is exiting from the MEN. Also in step 30, and in relation to the bandwidth information as relating to a CE node and its associated VPLS, central manager CM is informed of the desired VPLSs for each L2PE node; as demonstrated later, however, this desired result may not necessarily be achieved in an optimal connectivity configuration, but this information is available and indeed provides in part a baseline from which the preferred embodiment determines the connectivity within network system 10. In any event, once the physical topology, bandwidth, and VPLS information is available to central manager CM in step 30, then method 20 continues from step 30 to step 32.

Starting with and following step 32, central manager CM performs various operations with respect to a given VPLS node of network system 10, where in an exemplary embodiment the operations are first performed for a first VPLS at a first L2PE node, followed by operations for the first VPLS at a second L2PE node, and so forth, until all L2PE nodes are comprehended. Thereafter, the steps are repeated fro a second VPLS at the first L2PE node, followed by operations for the second VPLS at the second L2PE node, and so forth, until eventually therefore various connectivity configurations are investigated for all desired VPLSs across L2PE nodes of the MEN, as will be further apparent from the remaining discussion.

Turning now to step 32 in more detail, central manger CM performs what may be perceived as three general operations, with respect to a given VPLS. Considering then a given VPLS (e.g., $VPLS_1$ in FIG. 1), and with respect to a first L2PE node (e.g., L2PE node $L2PE_1$ in FIG. 1), the first of the three step 32 operations is the selection of a primary ingress node, hereafter indicated as PE node $PE_{pi}$ and a primary egress PE node, hereafter indicated as PE node $PE_{pe}$, where in both cases the reference to these PE nodes as "primary" is intended to demonstrate that they are to be considered for the primary portion of the 1+1 configuration, as opposed to the backup (or secondary) portion of that same configuration. Thus, in the example of FIG. 1, this first operation may select PE node $PE_2$ as PE node $PE_{pi}$ and PE node $PE_5$ as PE node $PE_{pe}$. In a second operation, central manager CM determines the bandwidth to be provided into the primary ingress node $PE_{pi}$; in the preferred embodiment, this determination may be made with reference to the two-dimensional bandwidth table identified in step 30, as shown by way of example in Table 3, since that table provides CE node-to-CE node bandwidth, and that connectivity is through the intermediate PE nodes in system 10. In a third operation, central manager CM determines the bandwidth to be provided out of the primary egress node $PE_{pe}$; in the preferred embodiment, this determination also may be made with reference to the two-dimensional bandwidth table identified in step 30, as shown by way of example in Table 3. Next, method 20 continues from step 32 to step 34.

In step 34, central manager CM operates in a comparable manner as it did in step 32, with a difference being that the PE nodes at issue in step 34 are for the backup (or secondary) connectivity in the 1+1 protection configuration. Thus, in step 34, again there are what may be perceived as three operations. First, central manager CM selects a secondary ingress node, hereafter indicated as PE node $PE_{si}$ and a secondary egress PE node, hereafter indicated as PE node $PE_{se}$, where in both cases the reference to these PE nodes as "secondary" is intended to demonstrate that they are to be considered for the secondary portion of the 1+1 configuration. In a second operation, central manager CM determines the bandwidth to be provided into the secondary ingress node $PE_{si}$, and in a third operation, central manager CM determines the bandwidth to be provided out of the secondary egress node $PE_{se}$. Recall that step 32, above, determined bandwidth into and out from PE nodes $PE_{pi}$ and $PE_{pe}$, respectively; in step 34, these same bandwidth values are used for PE nodes $PE_{si}$ and $PE_{se}$, respectively, in order to provide the same bandwidth for the primary and secondary routes. Next, method 20 continues from step 34 to step 36.

In step 36, central manager CM establishes LSPPs between PE nodes $PE_{pi}$ and $PE_{pe}$, that is, for the primary route. In the preferred embodiment, the selection of the LSPPs is by selecting the P nodes to form those LSPPs, and as seen later these selections are also limited by various constraints. Further, the criteria for the step 36 selection are preferably based on either distribution of the load among all P nodes in the LSPP or, alternatively, the shortest number of P nodes in the LSPP. In the case of distributing the load, it may be acceptable for an LSP to traverse through many P node hops, as long as one particular P hop is not much more loaded compared to other P node hops; thus, a percentage or level of tolerance may be established whereby each hop load is within a certain percentage of all other hop loads along the LSP. In the case of minimizing the number of P nodes in the LSPP, the preferred approach is as follows. Given a set of P nodes, and PE nodes $PE_{pi}$ and $PE_{pe}$, then the edge between P nodes is labeled, with a value of one if bandwidth is available or with a value of infinity if bandwidth is not available. Next, the preferred embodiment runs a known Dijkstra algorithm and queries whether the resultant LSP between PE nodes $PE_{pi}$ and $PE_{pe}$ satisfies delay constraints and has enough bandwidth to carry traffic. These steps are repeated until an optimal LSP is found in both directions between PE nodes $PE_{pi}$ and $PE_{pe}$. Next, method 20 continues from step 36 to step 38.

In step 38, central manager CM establishes LSPPs between PE nodes $PE_{si}$ and $PE_{se}$, that is, for the secondary route. In the preferred embodiment, the selection of these LSPPs is according to the same manner used for the primary route LSPPs described above in connection with step 36 (e.g., the shortest number of P node hops or distributing the load equally or near-equally among all P nodes in the LSP). In addition, however, the P nodes used for the step 36 selection are excluded from consideration in the step 38 selection. This ensures that the backup LSPs are physically disjoint from primary path LSPs while also providing sufficient bandwidth to allow for 1+1 protection. Next, method 20 continues from step 38 to step 40.

In step 40, central manager CM determines whether the configuration established thus far (e.g., PE node connectivity and primary and backup LSPs) violates any constraint in a set of constraints. In the preferred embodiment, the constraints may include any one or more of the following different constraints, and for those constraints that apply to paths, they are specified in each direction, that is, for each LSP in an LSPP. As a first constraint, a given L2PE node can multi-home only to those PE nodes within a certain geographical proximity; for instance, this limitation may be on the order of 10 kilometers, by way of example and recognizing that the numbers or range may vary based on implementation. As a second constraint, at a given L2PE node, a VPLS logical entity can connect to only one PE node. As a third constraint, bandwidth into a node also may not exceed any limit provided by the processing capability of that node, that is, different nodes may have different processing capabilities (e.g., PE node $PE_1$ may process a total of 10 G while PE node $PE_2$ may process only 5 G, and so forth; likewise for P nodes). As a fourth constraint, a VPLS comprising of VPLS logical entities within various L2PEs would span or include multiple PE nodes. As a fifth constraint, traffic between a VPLS logical entity and a PE node $PE_x$ should be less than or equal to available bandwidth on the link between that VPLS logical entity and the PE node $PE_x$. As a sixth constraint, for every VPLS, a PE node can connect to only a subset of certain given number P nodes, that is, for all possible P nodes, some may be excluded as candidate for connectivity to a given VPLS. As a seventh constraint, bandwidth should be equalized in that the sum of bandwidth entering a PE node $PE_x$ (possibly from multiple L2PE nodes) plus the sum of bandwidth entering that PE node $PE_x$ from any P nodes equals the bandwidth leaving that PE node $PE_x$ (towards any one or more L2PE nodes) plus the sum of bandwidth leaving that PE node $PE_x$ towards any P nodes. As an eighth constraint, at a P node, the sum of bandwidth entering the P node must be less than or equal to the sum of the bandwidth capabilities on the output link between that P node and its adjacent P node. As a ninth constraint, the sum of bandwidth entering all PE nodes must equal the sum of bandwidth leaving all PE nodes (to ensure that traffic does not circulate). As a final constraint, end to end delay limits may be provided for one or more paths (e.g., certain paths may carry TDM traffic which is delay sensitive) and these delay limits must be met. Given a set of some or all of these various constraints, step 40 determines whether any constraint in that set has been violated; if so, then method 20 discards the presently-considered set of connections resulting from the immediately-preceding steps 36 and 38 and then returns from step 40 to step 36, so that a new LSPP will be established for the primary configuration followed by the establishment in a successive step 38 of a new LSPP for the backup configuration, which thereafter again are tested by the constraints of step 40. Eventually, therefore, in many instances step 40 will be satisfied, that is, no constraint will be violated, after which method 20 continues from step 40 to step 42. Note alternatively, however, that at certain instances in the traffic design methodology, there may arise an instance where after numerous loops including steps 36, 38, and 40, there is indeed a point at which no set may be established that satisfies the constraints observed in connection with step 40; toward this end, an appropriate heuristic may be developed by one skilled in the art so as to determine when this point is reached so as to respond appropriately with either a change in flow of method 20, an interrupt, or other desired response so as to continue with the flow while observing that a sufficient number of iterations have occurred so as to likely reach an optimal solution.

In step 42, central manager CM stores the connectivity information that it has developed in the preceding steps and that satisfied the constraints with respect to step 40; thus, for a case where steps 32 through 40 have been performed a first time with respect to a first VPLS and a first L2PE node, then the associated connectivity is stored. Next, method 20 continues from step 42 to step 44.

In step 44 central manager CM determines whether the MEN includes another L2PE node that has not yet been considered and that is specified in the information learned in step 30 as desirably including the present VPLS being considered. For example again with reference to FIG. 1, if steps 32 through 42 have just been completed a first time with respect to $VPLS_1$ and relative to L2PE node $L2PE_1$, then step 44 determines that $VPLS_1$ also should be considered relative to L2PE node $L2PE_3$. If an additional L2PE node should thus be considered, then step 44 advances the flow to a step 46 which advances the consideration to that next L2PE node (e.g., $L2PE_3$), and the flow returns to step 32. If, instead, all L2PE nodes have been considered in relation to the present VPLS (e.g., $VPLS_1$), then method 20 continues from step 44 to step 48.

In step 48 central manager CM determines whether the MEN includes another VPLS that has not yet been considered and that is specified in the information learned in step 30. For example again with reference to FIG. 1, if steps 32 through 44 have just been completed a first time with respect to $VPLS_1$, then step 48 determines that $VPLS_2$ also should be considered relative to the MEN. If an additional VPLS should thus be considered, then step 48 advances the flow to a step 50 which advances the consideration to that next VPLS node (e.g., $VPLS_2$), and the flow returns to step 32. If, instead, all VPLSs have been considered, then method 20 continues from step 48 to step 50.

In step 52, central manager CM determines a cost function of the stored connectivity as relating to all VPLSs across those L2PE nodes to which those VPLSs were deemed to support in the preceding steps 32 through 42. In other words, note that when step 52 is reached, a set of different homing configurations has been developed, where that set includes a different homing configuration for each iteration described above, that is, there may be a different homing configuration for the iteration related to $VPLS_1$ in $L2PE_1$, for the iteration related to $VPLS_1$ in $L2PE_2$, . . . , for the iteration related to $VPLS_1$ in $L2PE_5$, for the iteration related to $VPLS_2$ in $L2PE_1$, for the iteration related to $VPLS_2$ in $L2PE_2$, . . . , for the iteration related to $VPLS_2$ in $L2PE_5$, and so on up to for the iteration related to $VPLS_3$ in $L2PE_5$. Collectively, these iterations and the respective configurations of each therefore provide an entire set of homing configurations, including in this example those in $VPLS_1$ in $L2PE_1$, . . . , $VPLS_3$ in $L2PE_5$. Thus, in step 52, central manager CM determines the cost function for this set of homing configurations. One skilled in the art may determine various different cost functions that may be calculated for step 42. As one example, in one preferred embodiment, the cost function is the total number of VPLS connections (or logical VPLS entities) that are included in the stored connectivity for the MEN system 10. By way of example, if the stored connectivity corresponds to that shown in FIG. 1, then step 52 will identify a total number of ten VPLS connections, with three VPLS connections in L2PE node $L2PE_1$, one VPLS connection in L2PE node $L2PE_2$, two VPLS connections in L2PE node $L2PE_3$, three VPLS connections in L2PE node $L2PE_4$, and one VPLS connection in L2PE node $L2PE_5$. Next, method 20 continues from step 52 to step 54.

In step 54 central manager CM determines whether a sufficient number of iterations have been performed of the above-discussed steps; note that this determination may be made with respect to the applicable cost function, that is, whether a sufficient diversity in cost functions have been found and that correspond to respective different homing configurations (where recall that a cost function is determined for each homing configuration in the step 52 that operates with respect to that configuration). Alternatively, step 54 may be based on comparing the number of iterations, by having kept a counter of those iterations, with some threshold. Indeed, the overall traffic engineering in a multi-homed VPLS network is presumed by the present inventors to present a so-called NP-Hard problem, that is, one in which there is no absolute best case due to the impossibility of completely considering the preceding alternatives; specifically in the present context, as each connectivity configuration is determined for a VPLS, there is the complexity of evaluating it relative to already-determined connectivity configurations for both that VPLS as well as other VPLSs. Given this attribute, it may be that an absolute number of iterations may be presumed to find an optimal, or at least acceptable, solution. In any event, if the condition(s) of step 54 is such that more iterations are desired, then the flow of method 20 returns continues from step 54 to a step 56 that returns the flow back to the first VPLS (e.g., VPLS$_1$), and the flow returns to step 32; thus, for that instance of step 32 and following, a new set of homing configurations will be ascertained, first for that first VPLS at a first L2PE node, followed by that first VPLS at a second L2PE node, again reaching a consideration of connectivity at all desired L2PE nodes and then for all other VPLSs across all desired L2PE nodes. Alternatively, if the condition(s) of step 54 is such that more iterations are no longer desired, then the flow of method 20 continues from step 54 to step 58.

In step 58, having been reached after a number of different sets of homing configurations are determined from the preceding steps, then central manager CM chooses the set of homing configurations that has the best cost function among those configurations. For example, in the case where the cost function is number of VPLSs as described above with respect to step 52, then step 58 may select that set of homing configurations which has the largest number of logical VPLS entities for the MEN, and if there is more than one connectivity configuration having a same maximum number of logical VPLS entities, then one skilled in the art may include additional considerations in the cost function so that one of those connectivity configurations is selected. The best cost function is therefore associated with an output connectivity configuration that includes the number and choice of PE node homes, LSPs, and number of logical VPLS entities. This selection is thus the connectivity that is then to be used in actual configuration of the MEN system 10. Indeed, in the case when central manager CM is part of that system 10, that information is then later used to signal to the various nodes so as to implement this connectivity. Finally, after step 58, method 20 continues to step 60, then method 20 is complete as shown in a complete state 60. Thus, following the complete step 58 or as a part thereof, central manager CM has an optimal connectivity configuration for a multi-homed multiple VPLS system in network 10, and that connectivity configuration may be provided by central manager CM to each node so as to achieve that connectivity.

The preceding discussion of method 20 and its various steps provide an optimal connectivity configuration for a multi-homed multiple VPLS system as may be implemented when a MEN is being initially configured. However, the preferred embodiments also contemplate that much of method 20 may apply to an existing MEN, where either new traffic and/or new VPLSs are added to that network. Specifically, in such instances, the preferred embodiment determines which PE node to home for a newly-added VPLS and/or possibly adds a new home to a new PE node if blocking is exceeded. In either case, this additional connectivity may be achieved by performing method 20, while eliminating steps 32 and 34; in place of those steps, desired connectivity for the newly-added traffic/VPLS is selected from the already-existing LSPPs while all other steps of method 20 are performed. In this manner, existing traffic and its respective setup is unaffected.

From the above illustrations and description, one skilled in the art should appreciate that the preferred embodiments provide a method for traffic engineering in a multi-homed VPLS computer network. The preferred embodiments as described provide numerous benefits. As one benefit, the preferred embodiments provide for connectivity with multi-homing, protection and multicast traffic considerations to be included in the optimization process. As another benefit, the preferred embodiments provide dynamic assignment of homes (i.e., connections) in real time as new VPLSs are established and do not require re-doing the complete optimization problem each time a new VPLS is established. As another benefit, the preferred embodiments do not require re-routing of existing traffic flows as new VPLSs are added. As another benefit, the preferred embodiments are centralized and therefore likely to result in better network resource utilization as compared to a distributed algorithm using routing protocols such as PIM-SM and the like. As another benefit, the preferred embodiments allow QoS considerations to be included in the optimization process. As yet another benefit, the preferred embodiments provide a solution that scales well with an increase in the number of nodes. As a final benefit, while the present embodiments have been described in detail, various substitutions, modifications or alterations could be made to the descriptions set forth above without departing from the inventive scope which is defined by the following claims.

The invention claimed is:

1. In a processing device programmed to determine homing paths for a plurality of virtual private local area network services in an Ethernet network comprising a plurality of PE nodes, a method comprising:

computing a plurality of sets of different homing configurations;
wherein each homing configuration in each set of different homing configurations is computed by a respective iteration of steps;
wherein each iteration corresponds to a respective virtual private local area network service in the plurality of virtual private local area network services and for a respective selected layer two provider edge node in the Ethernet network; and
wherein each iteration comprises the steps of:
selecting an ingress PE node and an egress PE node;
determining bandwidth into the ingress PE node;
determining bandwidth out of the egress PE node;
specifying a first path for communication from the ingress PE node to the egress PE node and a second path for communication from the egress PE node to the ingress PE node, wherein each path of the first and second paths comprises at least one P node;
computing a cost function for each set of different homing configurations in the plurality of sets of different homing configurations; and
selecting a set of homing configurations from the plurality of sets of different homing configurations in response to a respective computed cost function.

2. The processing device of claim 1:
wherein each homing configuration comprises primary homing paths and secondary homing paths;
wherein the primary homing paths comprise the first and second paths;
and wherein the processing device is further programmed to determine the secondary homing paths for each homing configuration, wherein each iteration flirt her comprises the steps of:
selecting a secondary ingress PE node and a secondary egress PE node;
determining bandwidth into the secondary ingress PE node; and
determining bandwidth out of the secondary egress PE node;
specifying a third path for communication from the secondary ingress PE node to the secondary egress PE node and a fourth path for communication from the secondary egress PE node to the secondary ingress PE node, wherein each path of the third and fourth paths comprises at least one P node.

3. The processing device of claim 2 wherein each iteration farther comprises the steps of:
  determining whether either the first path or the second path violates a constraint set comprising at least one constraint; and
  determining whether either the third path or the forth path violates the constraint set.

4. The processing device of claim 2 wherein the constraint set comprises a constraint relating to the bandwidth along the first and second paths.

5. The processing device of claim 2 wherein the constraint set comprises a constraint selected from a set consisting of:
  a first constraint wherein a layer two provider edge node may multi-home only to PE nodes within a predetermined geographical proximity of the layer two provide edge node;
  a second constraint wherein a logical VPLS entity may connect to only one PE node;
  a third constraint, wherein traffic between a logical VPLS entity and a PE node is less than or equal to available bandwidth on a link between the logical VPLS entity and the PE node;
  a fourth constraint, wherein bandwidth is equalized in that a sum of bandwidth entering a PE node plus a sum of bandwidth entering that PE node from any P nodes equals a sum of bandwidth leaving that PE node plus a sum of bandwidth leaving that PE node towards any P nodes;
  a fifth constraint, wherein at a P node, a sum of bandwidth entering that P node must be less than or equal to the sum of the bandwidth capabilities on the output link between that P node and an adjacent P node;
  a sixth constraint, wherein a sum of bandwidth entering all PE nodes must equal a sum of bandwidth leaving all PE nodes;
  a seventh constraint, wherein bandwidth into a PE node may not exceed any limit provided by the processing capability of that PE node; and
  an eighth constraint, wherein end to end delay limits are provided for one or more paths.

6. The processing device of claim 2 wherein the plurality of PE nodes comprise fully-meshed PE nodes.

7. The processing device of claim 2 and further programmed to perform the steps of, prior to the computing step:
  inputting a set of P nodes in the Ethernet network; and
  inputting bandwidth capability between each P node, in the set of P nodes, and an adjacent P node in the set of P nodes.

8. The processing device of claim 7 and further programmed to perform the steps of, prior to the computing step:
  inputting a set of layer two provider edge nodes in the Ethernet network; and
  inputting bandwidth capability between each layer two provide edge node, in the set of layer two provider edge nodes, and each PE node in the plurality of PE nodes.

9. The processing device of claim 8 and further programmed to perform the step of, prior to the computing step, inputting bandwidth requirements information as between each customer edge node connected to the Ethernet network and any other customer edge node connected to the Ethernet network.

10. The processing device of claim 2 wherein the step of specifying a third path and a fourth path is in response to a number of P node hops in the third path and the fourth path.

11. The processing device of claim 2 wherein the step of specifying a third path and a fourth path is in response to distributing bandwidth load along a number of P node hops in the third path and the fourth path such that bandwidth load between each successive hop between successive P nodes is within a tolerance of a bandwidth load between each other successive hop between successive P nodes in a same path.

12. The processing device of claim 2 wherein the step of specifying a first path and a second path is in response to a number of P node hops in the first path and the second path.

13. The processing device of claim 2 wherein the step of specifying a first path and a second path is in response to distributing bandwidth load along a number of P node hops in the first path and the second path such that bandwidth load between each successive hop between successive P nodes is within a tolerance of a bandwidth load between each other successive hop between successive P nodes in a same path.

14. The processing device of claim 2 wherein the step of computing a cost function for each set of different homing configurations in the plurality of sets of different homing configurations comprises computing a total number of virtual private local area network service connections included in each set of different homing configurations.

15. The processing device of claim 14 wherein the step of selecting a set of homing configurations comprises selecting a set of homing configurations having a maximum total number of virtual private local area network service connections included in the selected set of homing configurations.

16. The processing device of claim 1 wherein the step of computing a cost function for each set of different homing configurations in the plurality of sets of different homing configurations comprises computing a total number of virtual private local area network service connections included in each set of different homing configurations.

17. The processing device of claim 16 wherein the step of selecting a set of homing configurations comprises selecting a set of homing configurations having a maximum total number of virtual private local area network service connections included in the selected set of homing configurations.

18. The processing device of claim 1 wherein the network comprises a Metro Ethernet network.

19. The processing device of claim 1 wherein one node in the plurality of nodes comprises the processing device.

20. The processing device of claim 1 and further programmed to perform the step of communicating information to PE nodes in the Ethernet network to configure nodes receiving the information, wherein the information is in response to the selected set of homing configurations.

21. A method of electronically determining homing paths for a plurality of virtual private local area network services in an Ethernet network comprising a plurality of PE nodes, comprising the steps of:
  determining a plurality of sets of different homing configurations;
    wherein each homing configuration in each set of different homing configurations is computed by a respective iteration of steps;
    wherein each iteration corresponds to a respective virtual private local area network service in the plurality of virtual private local area network services and for a respective selected layer two provider edge node in the Ethernet network; and
    wherein each iteration comprises the steps of:
      selecting an ingress PE node and an egress PE node;
      determining bandwidth into the ingress PE node;
      determining bandwidth out of the egress PE node;
      specifying a first path for communication from the ingress PE node to the egress PE node and a second path for communication from the egress PE node to the ingress PE node, wherein each path of the first and second paths comprises at least one P node;
determining a cost function for each set of different homing configurations in the plurality of sets of different homing configurations; and selecting a set of homing configurations from the plurality of sets of different homing configurations in response to a respective computed cost function.

* * * * *

UNITED STATES PATENT AND TRADEMARK OFFICE
CERTIFICATE OF CORRECTION

PATENT NO.        : 7,484,010 B2                                          Page 1 of 1
APPLICATION NO.   : 10/729124
DATED             : January 27, 2009
INVENTOR(S)       : Kamakshi Sridhar et al.

It is certified that error appears in the above-identified patent and that said Letters Patent is hereby corrected as shown below:

Column 13, line 2, in Claim 3: replace "farther" with --further--.

Signed and Sealed this

Thirtieth Day of June, 2009

JOHN DOLL
*Acting Director of the United States Patent and Trademark Office*